Figure 1:
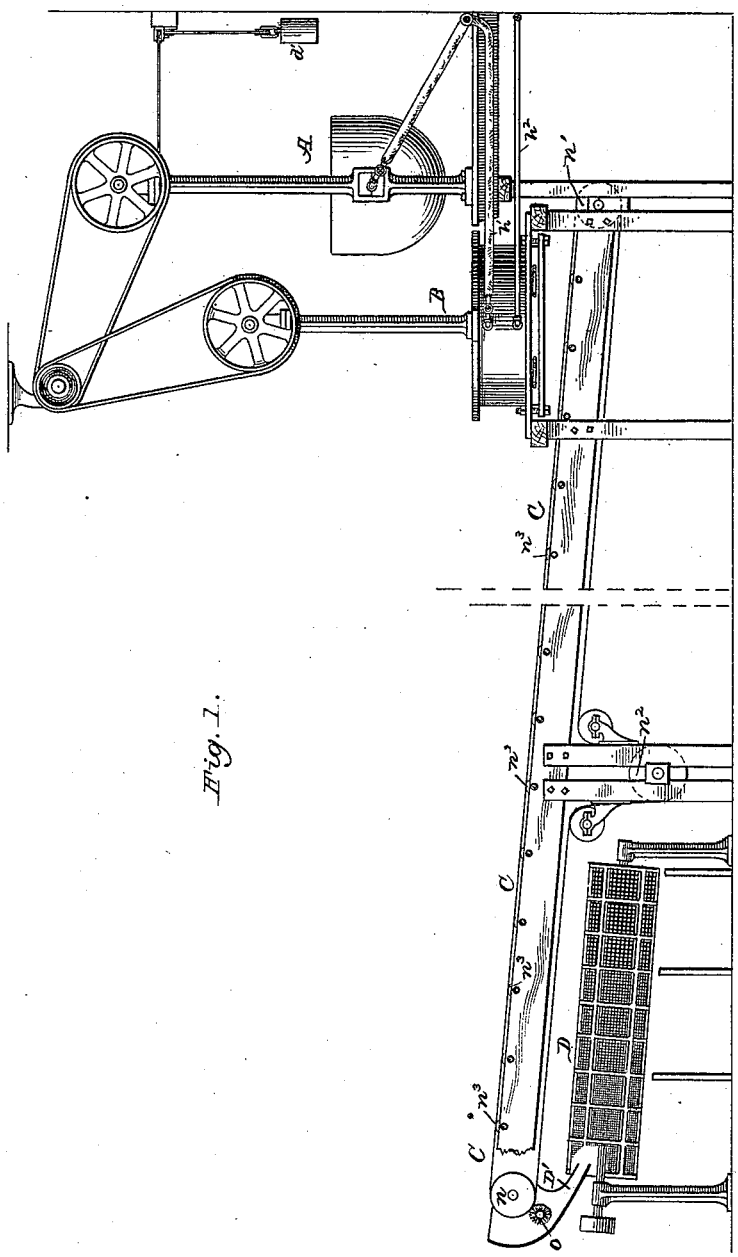

(No Model.) 3 Sheets—Sheet 1.
J. C. SCHRADER.
APPARATUS FOR MAKING DOPE FOR EXPLOSIVES.
No. 450,591. Patented Apr. 14, 1891.

(No Model.) 3 Sheets—Sheet 2.
J. C. SCHRADER.
APPARATUS FOR MAKING DOPE FOR EXPLOSIVES.
No. 450,591. Patented Apr. 14, 1891.
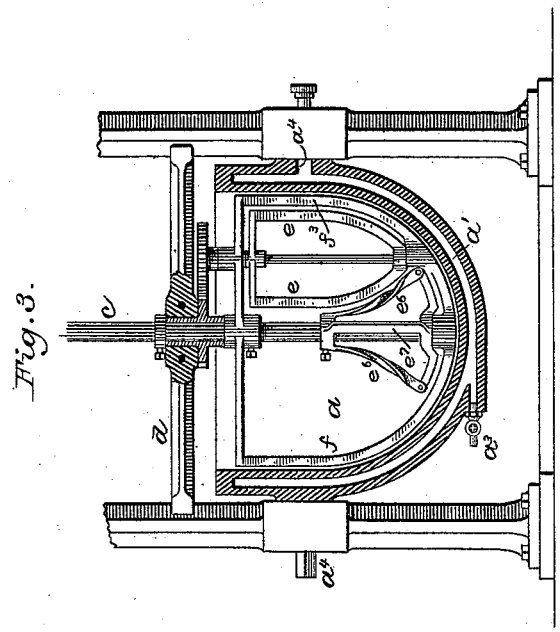
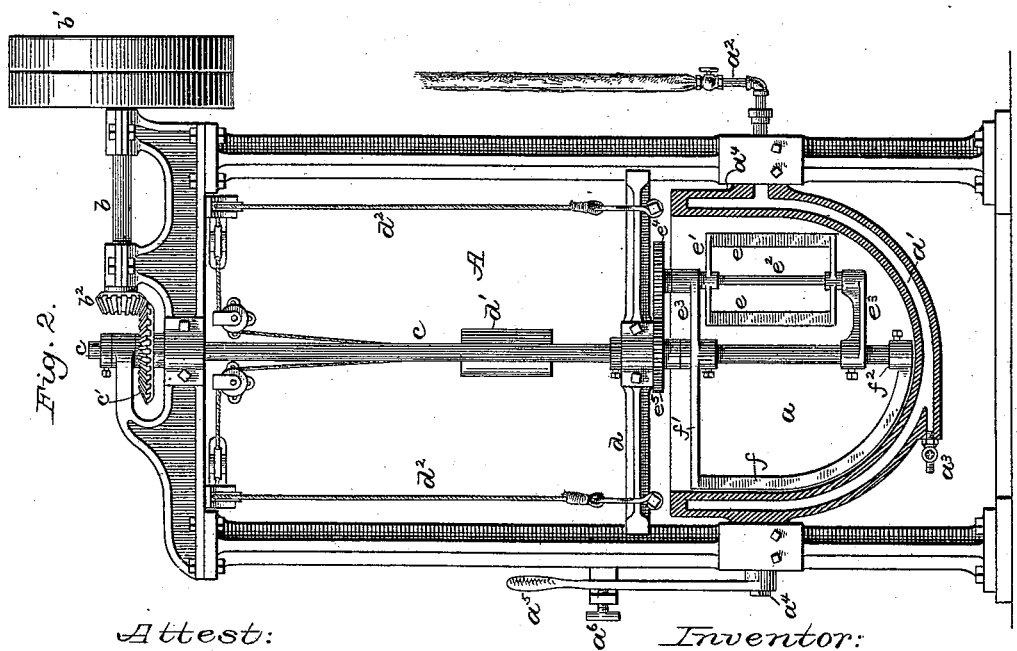
Attest:
Philip F. Larner.
Howell Bartle.
Inventor:
John C. Schrader.
By [signature]
attorney.

(No Model.) 3 Sheets—Sheet 3.
J. C. SCHRADER.
APPARATUS FOR MAKING DOPE FOR EXPLOSIVES.
No. 450,591. Patented Apr. 14, 1891.
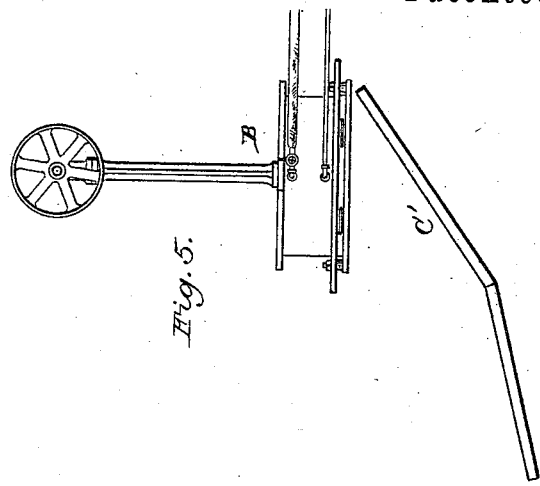
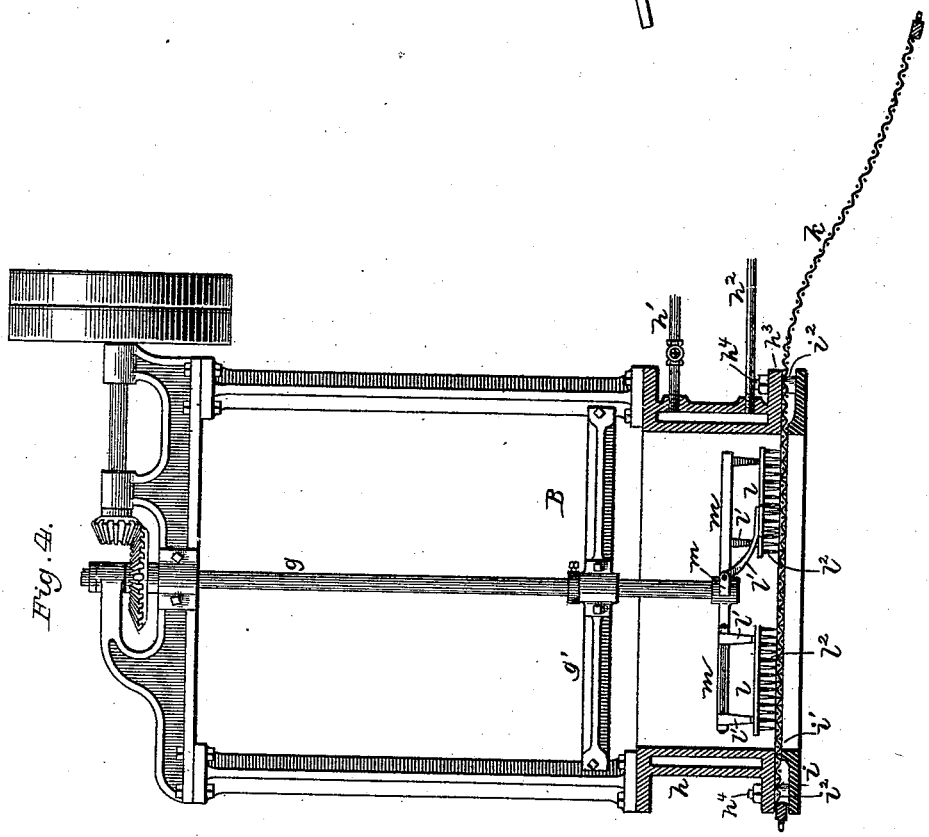
Attest:
Philip F. Larner.
Howell Battle.
Inventor.
John C. Schrader,
By McMood
Attorney.

UNITED STATES PATENT OFFICE.

JOHN C. SCHRADER, OF DOVER, NEW JERSEY, ASSIGNOR TO THE REPAUNO CHEMICAL COMPANY, OF WILMINGTON, DELAWARE, AND THE ATLANTIC DYNAMITE COMPANY, OF SAN FRANCISCO, CALIFORNIA.

APPARATUS FOR MAKING DOPE FOR EXPLOSIVES.

SPECIFICATION forming part of Letters Patent No. 450,591, dated April 14, 1891.

Application filed July 7, 1885. Serial No. 170,862. (No model.)

*To all whom it may concern:*

Be it known that I, JOHN C. SCHRADER, of Dover, in the county of Morris and State of New Jersey, have invented a certain new and useful Apparatus for Manufacturing Fusible Grained Dope for Explosive Compounds; and I do hereby declare that the following specification, taken in connection with the drawings furnished and forming a part of the same, is a clear, true, and complete description of my invention.

My said apparatus has been specially devised for the economical production of a certain variety of cellular-grained dope of which I believe myself to be the inventor, and said dope has been fully described in my application for Letters Patent filed May 29, 1884, Serial No. 133,235. Many other varieties of dope may, however, be produced by said apparatus, and especially such as require intimate admixture under comparatively high temperatures, graining after such admixture, and subsequent cooling with or without assorting.

My apparatus considered as a whole and in its best form embodies, first, a hot mixer, which includes a strong steam-jacketed vessel and one or more revolving scrapers, and one or more paddles or stirrers, all of which are also capable of being vertically reciprocated; second, a graining-screen, into which the compound is deposited from the hot mixer, this graining-screen including a steam-jacketed vessel, a wire screen, and a series of revolving combs or toothed clearers, which serve to force small masses of the compound through the meshes in the screen, and to prevent undue adhesion of the mass thereto, and, third, a cooling and conveying table which at one end underlies the graining-screen and extends therefrom through a space well exposed to cooling influences, whereby the grained compound is conveyed to any desired point and hardened by cooling in transit.

Inasmuch as the apparatus as thus far described will produce good results, there may or may not be employed therewith a set of assorting-screens to which the cooled grained matter is delivered by the cooling and conveying table, and by which said matter is assorted according to the size of grain. These elements have been so constructed and arranged by me in my complete apparatus as to enable the work to be perfectly performed with valuable economy in labor, and so that the operation can be carried on as a continuous process, notwithstanding the necessarily intermittent charging and discharging of the hot mixers. If but one of the latter be employed, the other portions of the apparatus are preferably so proportioned in capacity to the capacity of the mixer that while a charge of compound is undergoing the mixing and heating operations a previous charge can be grained, cooled, and assorted; but for obtaining the best results I employ two or more of such mixers and alternately charge them, so that more frequent charges of compound can be delivered to the graining-screen than can be when but one mixer is employed. I have also mounted the mixer upon hollow trunnions and so located it with reference to the graining-screen that the contents of the mixer may be readily dumped into the graining-screen.

Various minor details of invention will, after a full description thereof, be specified in the several clauses of claim hereunto annexed.

To more particularly describe the several features of my invention, I will refer to the accompanying drawings, in which—

Figure 1 is a side elevation of my complete apparatus in its most desirable form. Fig. 2 illustrates the hot mixer partially in front elevation and partially in vertical cross-section. Fig. 3 in section illustrates a more complex form of hot mixer. Fig. 4 illustrates the graining-screen partially in front view and partially in section. Fig. 5 illustrates the graining-screen in combination with a form conveying and cooling table differing from that shown in Fig. 1.

The hot-mixer A will be first described. The dry compound in a finely-ground condition and containing sulphur or other fusible matter is poured into the kettle $a$, and for melting the fusible matter said kettle is provided with a steam-space $a'$, communicating with circulating steam-pipes $a^2$, and having an exit and cock at $a^3$, by which water may be discharged, if need be. The high temperature required involves a correspondingly-high pressure of steam, and therefore this kettle is preferably composed of bronze and surely capable of resisting from one hundred and seventy-five to two hundred pounds pressure to the square inch. For enabling a convenient discharge of its contents said kettle is provided with trunnions $a^4$, which are hollow and afford jointed couplings for connecting with the steam-pipes. One of said trunnions is provided with a hand-lever $a^5$, which is locked by the screw-clamp $a^6$, for confining the kettle in its upright or working position. The support for said kettle is afforded by a heavy metal frame composed of two parallel uprights, and a head-piece on or in which boxes are mounted for a horizontal driving-shaft $b$, provided at one end with belt-pulleys $b'$ and at the other with a beveled gear $b^2$. Said head-piece also affords additional boxes for a sliding vertical shaft $c$, splined to a bevel-gear $c'$, which meshes with the driving-shaft gear $b^2$, and is confined as to vertical movement. The vertical shaft $c$ has also a guide-bearing at the center of a cross-head $d$, which at each end is forked and embraces portions of each upright of the frame, which therefore serve as guides.

Within the kettle and mounted on the vertical shaft $c$ are the paddles or stirrers $e\ e$ and the scraper $f$. The paddles $e$ are thin flat plates of bronze—say one-fourth of an inch thick and one and one-half inch wide—secured at top and bottom to arms $e'$, which are both centrally secured to a vertical shaft $e^2$, which has upper and lower bearings in brackets $e^3$, which are rigidly mounted on the vertical shaft $c$. The paddle-shaft $e^2$ at its upper end is provided with a gear $e^4$, having a hub which rests upon the upper bracket $e^3$. The cross-head $d$ has a downwardly-projecting central hub on which a stationary gear $e^5$ is mounted, so that as the shaft $c$ is revolved the paddles are rotated with a planetary movement around said shaft and also around their own shaft. The scraper $f$ is a thin blade of bronze, which is bent or curved to closely engage with the interior surface of the kettle, and at its upper end it is secured to the shaft $c$ at the hub of the upper bracket $e^3$ by an arm $f'$ and at its bottom by means of a socket $f^2$, and a clamp-screw. When the shaft $c$ is revolved, the scraper keeps the inner walls of the kettle free from unduly adhering matter and the paddles thoroughly mix the mass.

For discharging the contents of the kettle it is first necessary to remove the paddles and stirrer and thereby afford full access to the interior as well as to enable the kettle to be tilted on its trunnions. The shaft $c$ being splined to its gear is capable of being vertically reciprocated for lifting the paddles and stirrer. The shaft $c$ and the parts secured thereto are counterbalanced by means of a weight $d'$, which is connected to the cross-head $d$ by means of wire cords $d^2$, provided with suitable sheaves or pulleys, thus enabling the whole to be easily lifted and maintained in an elevated position.

The operation of the hot mixer can be somewhat accelerated by the duplication of the paddles or by also using other forms of paddles and additional scrapers, as illustrated in Fig. 3, wherein the paddles $e$ and scraper $f$ are substantially as before described, together with additional paddles $e^6$, mounted on and revolving with the shaft $c$ and an additional scraper $f^3$. When paddles are thus mounted directly on the shaft, good results will accrue from the use of slightly-twisted thin plates for paddle-blades, and vertical flat tangentially-inclined blades $e^7$ may well be employed closely adjacent to the shaft $c$.

The graining-screen B has a framing similar to that already described, a cross-head $g'$, and a vertical central shaft $g$ with gearing at its top, similar to the corresponding portions of the hot mixer, although in this machine the shaft and cross-head need only be capable of being lifted for facilitating repairs, and hence no balance-weight need be employed; but the cross-head at its ends has clamp-screws by which it may be secured at any desired elevation. This cross-head being normally near the foot of the uprights, it may be relied upon as a supporting-guide for the vertical shaft when the latter is provided with a collar and clamp-screw, as shown. As this portion of my apparatus is for the purpose of graining a compound which is rendered semi-plastic only because of the high temperature to which it is exposed, it is necessary that means for keeping up the temperature be provided, and I therefore employ the steam-jacketed annular shell $h$, which, like the mixer-kettle, is composed of bronze and capable of resisting high pressures of steam which is conducted to and from the steam-space by the pipes $h'$ and $h^2$. The annular shell $h$ is mounted upon a platform above a rectangular screen-supporting plate $i$, provided with a central circular opening corresponding in diameter with said shell and having a vertical annular web $i'$. At each corner of said plate are bolt-holes provided with bosses $i^2$, which are a little higher than the web $i'$. The bolts $h^4$ are so mounted in the flange of the shell and in the bolt-holes of the screen-supporting plate that the latter may be lifted by said bolts to any desired extent.

The space between the annular web $i'$ and the lower edge of the shell $h$ is sufficient to allow of the introduction of a wire screen. This screen may be only large enough to serve as a perforated bottom to the shell $h$ and do good service; but in order to secure the best results I employ a screen $k$, which is wider than the diameter of the shell and two or more times longer, and is provided with one or more handles, so that it may be readily moved to and fro longitudinally for presenting different portions thereof for service. For obtaining the best general results this screen should have about four meshes to the inch, although other dimensions may be employed according to circumstances. When desired, the bolts by which the shell and the plate $i$ are connected may also be relied upon for firmly clamping the screen between the web or rim $i'$ and the shell.

The compounds to be grained are usually very sluggish and heavy, and therefore it is necessary to not only keep it in motion but to keep it well heated, and also to employ means for constantly clearing the face of the screen and actually forcing the compound through its meshes in small quantities. I have therefore devised a toothed comb or clearer $l$, of which I use four. The shaft $g$ has four rigid horizontal radial arms $m$ below the cross-head $g'$. Each comb has a back plate and two arms or handles $l'$, rigidly secured thereto, and said arms are hinged to their proper radial arm $m$. The teeth $l^2$ of each comb are larger than the meshes of the screen, and their tips are rounded so that they can partially enter the open mesh of the screen and force a quantity of the compound into it, if not actually through it, so that in the latter case when the same mesh is traversed by the same tooth or a tooth of another comb a further quantity of compound will be forced therein, and thus cause the first to be discharged therefrom into the open cooling-space below. It sometimes occurs, either from the undue cooling of the compound in the meshes of the screen or from the occasional failure of the comb-teeth to operate at certain points on the screen, that more or less of the meshes will become plugged, and this renders the longitudinal adjustment of the screen a matter of great practical importance, because it enables a thorough clearing to be easily done without stopping the machine. After the grained compound is thus delivered from the graining-screen it should be at once removed to avoid undue contact with the freshly-delivered soft grains and also for exposing it to cooling influences as rapidly as possible. I therefore employ as a preferred form of conveying and cooling table the endless traveling apron C, which at one end underlies the graining-screen and receives the grained compound directly therefrom. This endless apron is a strong heavy woven fabric mounted on a driven roll $n$ at one end, a guide-roll $n'$ at its opposite end near the graining-screen, and has a central tightening-roll $n^2$ (provided with vertically-slotted guide-bearings) and numerous small supporting-rolls $n^3$ beneath the upper portion of the apron. I prefer that the upper surface of said apron be about forty feet in length, although this may be varied without departure from my invention. The portion of the room in which it (said cooling and conveying table) is located should be well ventilated and arranged to afford a free circulation of air, either in natural or artificially-induced currents. As here shown, the apron is inclined, the lowest end being beneath the graining-screen, and this is desirable in this form of apparatus in order to afford space beneath the outer end of the apron for the revolving assorting-screen D and the several bins beneath it. Said screen is open at both ends and is of a usual construction, and is provided with a funnel-mouth D', into which the grained dope is discharged from the upper end of the apron, and a brush $o$ removes therefrom such grains as chance to adhere thereto.

While I prefer dope which is in irregular or angular grains, and therefore prefer that they should be cooled in substantially the forms naturally incident to the operation of the graining-screen, said grains may be more or less "shotted" or rounded, if desired, by employing a cooling or conveying table, as illustrated in Fig. 5. In this case the graining-screen B is as before described, but the cooling and conveying table C' is of sheet metal and sharply inclined, so that when the soft masses of compound fall upon it they will roll downward rapidly to and upon a less inclined portion of the table, and from thence to the floor or into an assorting-screen. The whole or any portion of said table may be rapidly vibrated laterally, if desired, by means of a shaft, a pitman, and crank, in a manner well known for more thoroughly rounding the grains.

In commencing operations the hot mixer is charged with the powdered compound and set in motion, and when ready to be discharged the paddles and clearer are lifted and the kettle tilted for dumping its contents into the graining-screen, which, with the rest of the apparatus, has meantime been set in motion, and if but one hot mixer be used and the graining-screen be properly proportioned thereto in size the entire apparatus may then be kept in motion. I prefer, however, to employ two hot mixers to each graining-screen, and thus provide for alternately discharging them at more or less frequent intervals, and so that one person can attend both mixers and without other aid charge and discharge them and readily supervise the automatic operations of the remainder of the apparatus.

For generally indicating relative proportions I will state that I obtain good results with mixer-kettles of about one hundred gallons capacity and a graining-screen shell about eighteen inches deep and forty-two inches inside diameter.

To avoid undue friction and liability of sparks from grit, I employ phosphor-bronze wherever practicable, and especially for all bearings and gearings, not only in the apparatus but adjacent thereto, and use chains or wire rope in lieu of belting, because of the destructive action of the sulphurous fumes. I also prefer to locate my apparatus in an isolated building having as little inside shafting as possible, and apply power to the several parts of the apparatus by way of shafting driven by connections outside of the building.

Having thus described my invention, I claim as new and desire to secure by Letters Patent—

1. The apparatus for manufacturing fusible grained dope, substantially as hereinbefore described, consisting of the following elements, in combination: first, a hot mixer embodying a steam-jacketed kettle and stirring-paddles and a clearer; second, a graining-screen embodying a steam-jacketed annular shell and one or more revolving combs, and, third, a conveying and cooling table whereby a fusible powdered compound may be mixed and heated, then discharged into the graining-screen, and by the latter delivered in grains upon the table for conveying them from beneath said screen and hardening them by cooling in transit.

2. In an apparatus for graining dope compound while in a fused and semi-plastic condition, the combination of the steam-jacketed graining-screen from which said semi-plastic compound is forced in small detached quantities in grain-like form, and a conveying and cooling table beneath said screen for receiving the grained dope and conveying it away from said screen, and hardening the grains by cooling them in transit, substantially as described.

3. In an apparatus for graining fused dope compound, the combination of the steam-jacketed graining-screen, from which small detached portions of the semi-plastic compound are forced in grain-like form, a conveying and cooling table receiving the grains dropped from the screen and cooling them in transit, and an assorting-screen into which the grains are delivered by the cooling-table, substantially as described.

4. The combination, substantially as hereinbefore described, of the graining-screen and the hot mixer embodying a kettle mounted on trunnions above and closely adjacent to said screen, whereby the contents of said kettle may be readily discharged into the screen, as set forth.

5. The combination of the steam-jacketed kettle mounted on trunnions, the vertically-sliding shaft, and the paddles and clearers mounted on and driven by said shaft, substantially as described.

6. The combination of the graining-screen shell and the longitudinally-adjustable screen beneath said shell, substantially as described.

7. In an apparatus for graining dope compound which is made semi-plastic by heat, the combination of a receptacle consisting of a steam-jacketed shell and a screen serving as the bottom of said receptacle, a driving-shaft, and one or more toothed combs carried by said shaft and dragged over the surface of the screen for forcing detached portions of the semi-plastic dope in grain-like form through the meshes of the screen and causing them to drop into cooling-space, substantially as described.

JOHN C. SCHRADER.

Witnesses:
F. P. THIBON,
JAMES H. NEIGHBOUR.